United States Patent
Olsen et al.

(10) Patent No.: US 6,457,943 B1
(45) Date of Patent: Oct. 1, 2002

(54) LIGHTNING PROTECTION FOR WIND TURBINE BLADE

(75) Inventors: Kaj Olsen, Lystrup; Peter Grabau, Kolding; Flemming Møller Larsen, Stubbum, all of (DK)

(73) Assignee: IM Glasfiber A/S (DK)

( * ) Notice: Subject to any disclaimer, the term of this patent is extended or adjusted under 35 U.S.C. 154(b) by 0 days.

(21) Appl. No.: 09/786,545

(22) PCT Filed: Sep. 9, 1999

(86) PCT No.: PCT/DK99/00476
§ 371 (c)(1),
(2), (4) Date: Mar. 6, 2001

(87) PCT Pub. No.: WO00/14405
PCT Pub. Date: Mar. 16, 2000

(30) Foreign Application Priority Data

Sep. 9, 1998 (DK) .................................. 199801127

(51) Int. Cl.$^7$ ............................................. F01D 5/14
(52) U.S. Cl. .................... 416/230; 416/241 A; 244/1 A
(58) Field of Search ................. 416/230, 229 A, 416/226, 241 A; 244/1 A, 71, 53 R

(56) References Cited

U.S. PATENT DOCUMENTS

| | | | | |
|---|---|---|---|---|
| 3,210,764 A | * | 10/1965 | Anderson et al. | 343/708 |
| 4,015,263 A | * | 3/1977 | Koerner et al. | 343/708 |
| 4,339,230 A | | 7/1982 | Hill | |
| 4,449,053 A | * | 5/1984 | Kutcher | 290/44 |
| 4,522,561 A | * | 6/1985 | Carter, Jr. et al. | 416/11 |
| 4,522,889 A | | 6/1985 | Ebneth et al. | |
| 4,944,655 A | | 7/1990 | Merz | |
| 5,260,124 A | | 11/1993 | Gaier | |
| 5,314,309 A | * | 5/1994 | Blakeley et al. | 416/226 |
| 5,745,081 A | * | 4/1998 | Brown et al. | 343/705 |
| 5,800,129 A | * | 9/1998 | De La Grandmaison et al. | 416/224 |
| 5,863,181 A | * | 1/1999 | Bost et al. | 416/224 |
| 6,102,662 A | * | 8/2000 | Bost et al. | 416/224 |

FOREIGN PATENT DOCUMENTS

| | | |
|---|---|---|
| DE | 30 40 838 A1 | 5/1982 |
| DE | 44 36 197 A1 | 4/1996 |
| DE | 197 48 716 | 11/1998 |
| DK | 1998 00009 U3 | 9/1998 |
| EP | 0 718 495 A1 | 6/1996 |
| WO | WO 96/07825 | 3/1996 |
| WO | WO 98/18166 | 4/1998 |

OTHER PUBLICATIONS

C.C.R. Jones of EMTECK Ltd. and B.J.C. Burrows of LTT, A Designers Guide to the Correct Use of Carbon Fibre Composite Materials and Structures Used in Aircraft Construction, To Protect Against Lightning Strike Hazards, pp. 1–123, Jan. 1990.

DEFU: Lynbeskyttelse af vindmøller Del 7 (Lightning Protection of Windmills, Part. 7); Publication from Culham Laboratory; pp. 2–39, May 1998.

DESITEK A/S, "Overspændingsbeskyttelse"pp. 6–13, 1996.

* cited by examiner

Primary Examiner—Edward K. Look
Assistant Examiner—James M McAleenan
(74) Attorney, Agent, or Firm—Brinks Hofer Gilson & Lione

(57) ABSTRACT

A wind turbine blade with a lightning conductor, where said lightning conductor is formed by one or more oblong strips (1, 2, 3) of carbon fiber-reinforced plastics preferably forming part of the wind turbine blade. In this manner the oblong strips (1, 2, 3) of carbon fiber-reinforced plastics both reinforce the blade and divert the lightning.

7 Claims, 3 Drawing Sheets

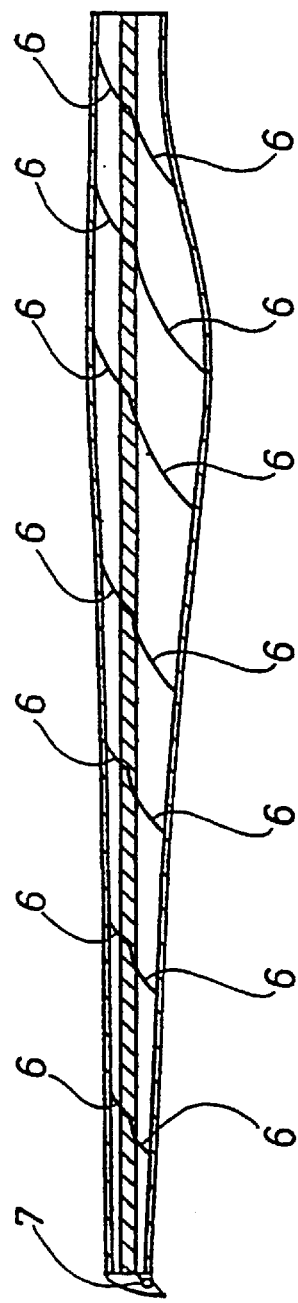
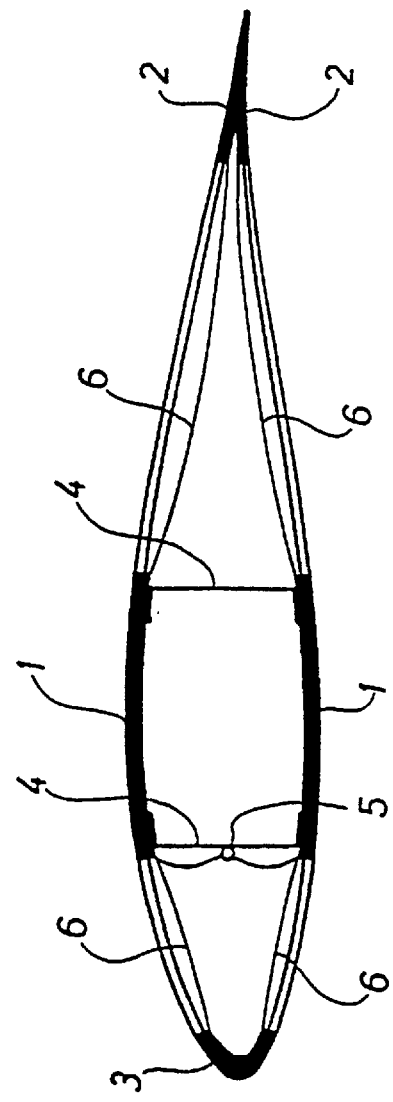
Fig. 1
Fig. 2

LIGHTNING PROTECTION FOR WIND TURBINE BLADE

TECHNICAL FIELD

The invention relates to a wind turbine blade of glass or carbon fibre reinforced plastics comprising a conventional inner lightning conductor cable.

BACKGROUND ART

Strokes of lightning involve extremely strong currents of the magnitude 10 to 200 kA within a very short period. The effect is very strong and can cause burstings because the air confined in the blade expands explosively. It is known to insert strong interlaced cables in the blade. Then a metal collector is provided at the tip of the blade, said metal collector being of a predetermined width and serving to capture the lightning as well as to prevent this location from being too strongly heated. Such a wind turbine blade is known from WO 96/07825.

Furthermore it is known to reinforce the blade by means of a carbon fibre coating. A copper web can optionally be applied onto the carbon fibre coating so as to protect said carbon fibre coating.

BRIEF DESCRIPTION OF THE INVENTION

The object of the invention is to provide an improved wind turbine blade with a lightning conductor.

A wind turbine blade of the above type is according to the invention characterised in that the blade wall comprises oblong strips of carbon fibre-reinforced plastics and that the inner lightning conductor cable and the oblong strips at regular intervals are interconnected by means of conductors.

The oblong strips of carbon fibre-reinforced plastics improve the stiffness of the wing, and the risk of flash-overs between the inner lightning conductor cable and the electrically conducting oblong strips is reduced by the potential-equalising by the interconnections at regular intervals. Thus a suitably stiff, relatively cheap and lightning protected wind turbine blade is obtained.

BRIEF DESCRIPTION OF THE DRAWING

The invention is explained in greater detail below with reference to an embodiment shown in the accompanying drawing, in which FIG. 1 is a longitudinal sectional view of a wind turbine blade according to the invention comprising a lightning conductor in form of oblong strips of carbon fibre-reinforced plastics, FIG. 2 is a cross-sectional view of the wind turbine blade of FIG. 1.

BEST MODE FOR CARRYING OUT THE INVENTION

The damages to the wind turbine blades caused by strokes of lightning can be rather comprehensive. Extremely strong currents of the magnitude 10 to 200 kA are involved within a very short period. The power involved is low, but the effect is very strong and can cause burstings because the air confined in the blade expands explosively. It is known to insert strong interlaced cables in the blade so as to divert the lightning. Then a particular receptor is provided at the tip of the blade, said receptor serving to capture the lightning as well as to prevent this location from being too strongly heated. Furthermore it is known to reinforce each blade by means of a carbon fibre coating. A copper web can optionally be applied onto the carbon fibre coating so as to protect said coating.

Figure 5:
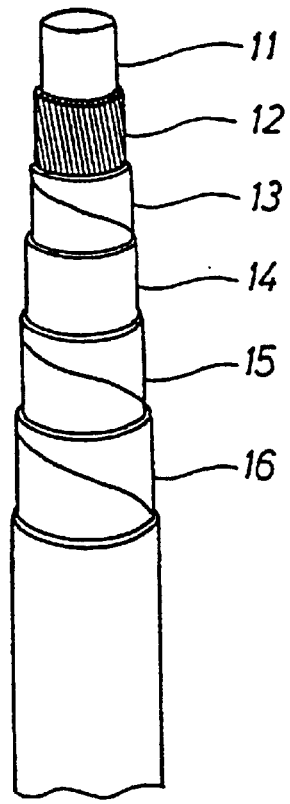
FIG. 5 illustrates a lightning conductor cable which can be inserted in the wind turbine blade.

According to the invention, an amount of carbon fibre material is added to the blade with the result that said blade per se can serve as lightning conductor. The carbon fibre material serving as a lightning conductor is according to the invention formed by one or more oblong strips 1, 2, 3 of carbon fibre-reinforced plastics, which preferably form part of the laminate of the blade. Moreover, a carbon stick can be provided in the interior of each blade, and the oblong strips 1, 2, 3 can be connected to said inner carbon stick. The blade can be provided with inner reinforcing members 4. A conventional lightning conductor cable 5 can, if desired, be provided on the inner carbon conductor or one one of the inner reinforcing members 4. The conventional lightning conductor cable 5 can be structured as shown in FIG. 5. The terminations are, however, of a particular structure. FIG. 2 shows how the oblong conducting strips 1, 2, 3 can be connected to the inner carbon conductor or the inner lightning conductor cable 5 by means of conductors 6. FIG. 1 shows also the receptor 7 at the end of the blade.

The blade is manufactured in two halves, which are subsequently glued together along the edges. Each blade half is manufactured by way of casting of a glass material, carbon fibre laminates etc. in a mould. The mould has been coated in advance with a suitable release agent with the result that it is easy to remove the cast product after completion of the casting.

The blade is according to the invention shaped such that parts of said blade are formed by oblong strips of carbon fibre-reinforced plastics.

The carbon fibres are for instance available from Devold AMT A/S, 6030 Langevåg, Norway, and they are characterised by being electrically conducting to a predetermined degree, by being very thin and by presenting a high tensile strength.

As the tensile strength of carbon fibres is high and much higher than the tensile strength of the fibre glass, fibre glass structures are often reinforced by means of a predetermined amount of carbon fibres so as to increase the tensile strength and, if desired, also the rigidity.

Constructively speaking, the electrically conducting capacity of the carbon fibres can present both an advantage and a draw-back. In other words, when it is desired to obtain for instance an antistatic, electrically conducting epoxy flooring, it is possible to admix pieces of carbon fibres in the product so as to obtain said property. On the other hand, when it is desired to reinforce a large fibre glass structure to be mounted outdoors and accordingly involving the risk of lightning, these electrically conducting carbon fibres can form an active part of the diversion of the lightning. The latter involves, however, a risk of a local heating. When a sufficiently high amount of fibres are used in the structure, said fibres can, however, be constructively utilized. It is, however, necessary to know the electric properties of the carbon fibres. The resistivity of a material is usually referred to as the ohmic resistance of 1 m of the material having a cross section of 1 mm$^2$ and at 20° C.

It is, however, not possible to obtain carbon fibres of a cross section of 1 mm$^2$, and accordingly it is chosen to describe the results of some practical tests. Various widths are cut out of a plate of carbon fibres bound in polyester resin and of a thickness of 1 cm, whereafter the resistances are measured. The resistivity R of 1 cm$^2$ of the material of a length of 1 m at 20° C. was measured to be 300 ohms.

Figure 4:
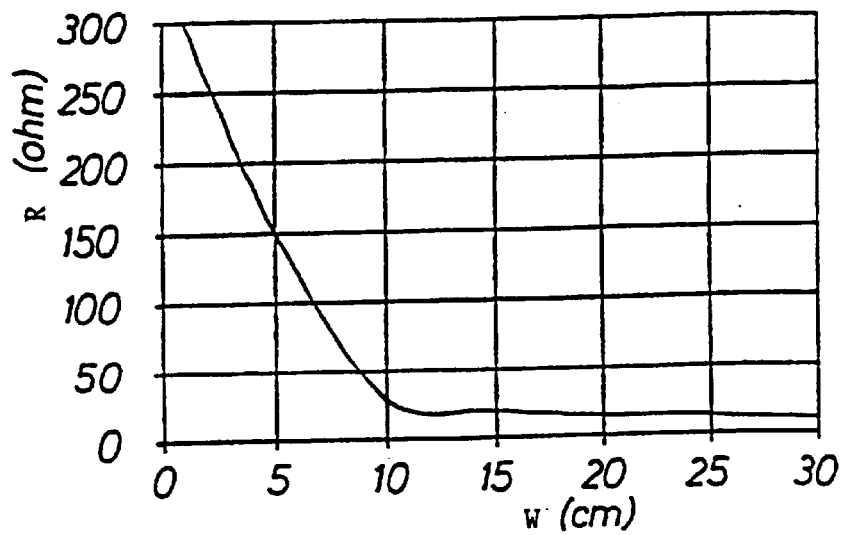
FIG. 4 illustrates the electric resistance of a carbon fibre coating versus the width.

When the widths of the material are larger Man above, the resistance is poorer than above. The resistance is inversely proportional to the cross-sectional area of the material, which has been illustrated by the curve in FIG. 4. This curve in FIG. 4 shows the resistance R versus various widths W of material of a constant thickness of 1 cm and a constant length of 1 m. As illustrated by the curve, the electric resistance R is relatively low in connection with large cross sections. A large gap applies, however, to the conductivity of metals.

Fibres are available where the individual fibres are coated with a metallic film, such as nickel, whereby the electric resistance is considerably reduced and makes said fibres interesting. In other words the fibres can be actively used both in form of ordinary fibres and in form of metal-coated fibres for lightning protection, viz. either as a directly active downconductor when the amount of fibres is sufficiently high and the thickness and the width are sufficient to ensure a low total electric resistance, or as a parallel downconductor. An efficiently and systematically potential-equalised structure of such a parallel downconductor renders it possible to utilize both its downconductor function and its reflection-dampening function in relation to the lightning currents.

The lightning conductor cable is for instance of the type shown in FIG. 5. The main conductor 12 surrounds an inner filler 11, said main conductor 12 comprising a plurality of juxtaposed copper wires. These copper wires are arranged so as to slightly twist about the filler 11. A semi-conductor layer 13 surrounds the conductor layer 12, and an insulating layer 14 of polyethylene surrounds said semi-conductor layer 13. Yet another semi-conducting layer 15 surrounds the polyethylene layer 14, and a copper screen 16 surrounds said additional semi-conducting layer 15. Such a structure is advantageous in the inductance per length unit being reduced to a minimum. The resulting voltage drop across the cable has been reduced to a minimum, whereby it is avoided to some extent that other parts of the wind turbine are damaged in connection with strokes of lightning. The terminations of the screen are in accordance with the guidelines presented by spc SCANPOCON ENERGI. These guidelines are referred to as "Tricore Upper Termination Instruction" concerning the upper end of the lightning cable and "Tricore Lower Termination Instruction" concerning the lower end of said lightning cable, respectively. Moreover, the guidelines for "Cold Shrink™ and Silicone Rubber Termination" are used for the uppermost end of the cable.

Figure 3:
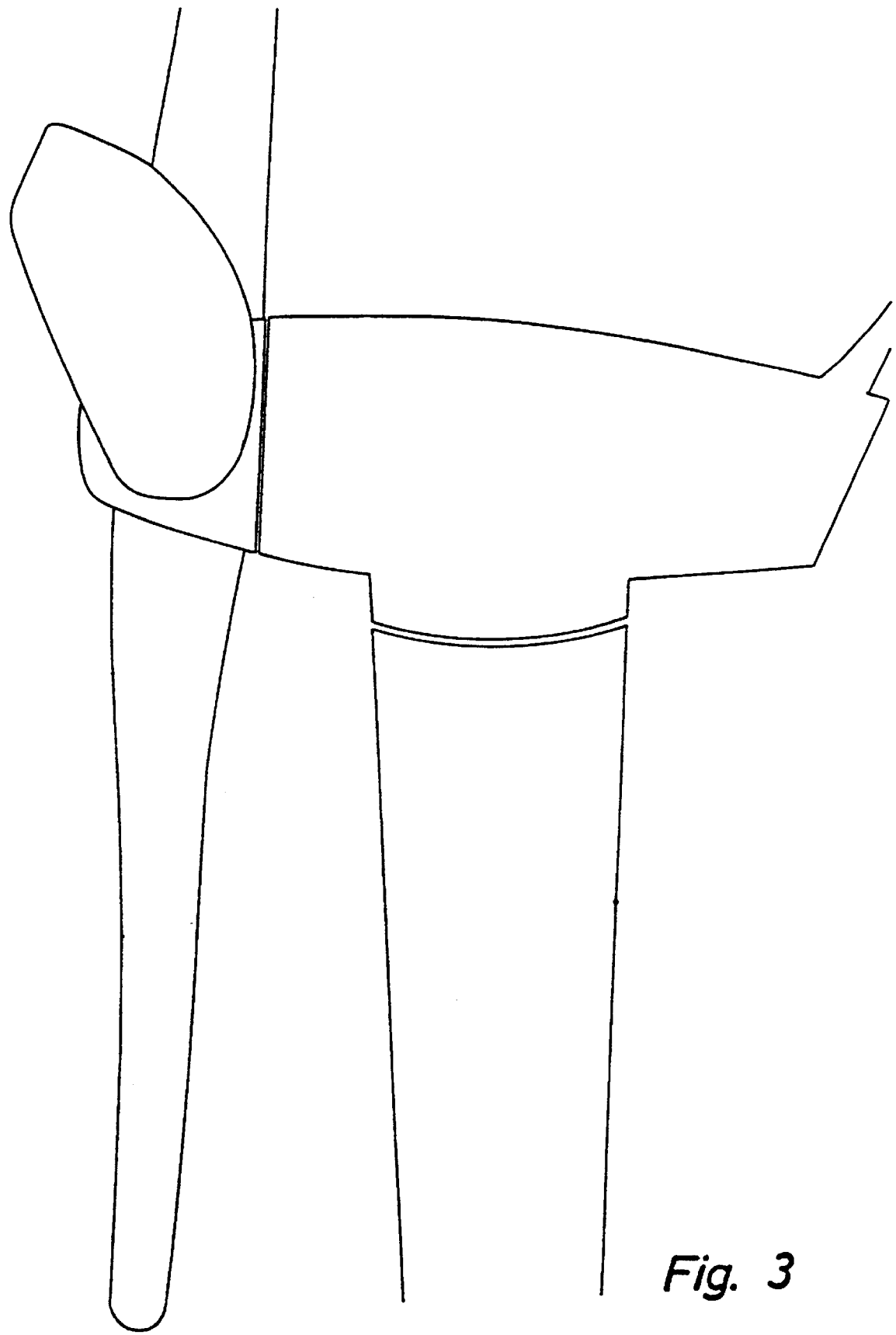
FIG. 3 illustrates the entire wind turbine.

FIG. 3 illustrates the entire wind turbine. The three blades are secured to a rotatably arranged hub. The hub is connected to a generator through a shaft and a gearbox, said generator being accommodated in a rotatably arranged housing of the wind turbine.

The invention has been described with reference to a preferred embodiment. It can, however, be modified in many ways without thereby deviating from the scope of the invention.

What is claimed is:

1. A wind turbine blade of glass and/or carbon fibre-reinforced plastics including an inner lightning conductor cable, the wind turbine blade comprising:

a blade wall including oblong strips containing carbon fibre-reinforced plastics; and conductors that interconnect the inner lightning conductor cable and the oblong strips at regular intervals.

2. The wind turbine blade according to claim 1 further including inner reinforcing members of carbon fibre-reinforced plastics which are connected to the lightning conductor cable and at least some of the oblong strips.

3. The wind turbine blade according to claim 2 wherein the oblong strips and the inner lightning conductor cable are interconnected at seven positions, seen in a longitudinal direction.

4. The wind turbine blade according to claim 2 wherein at least one of the carbon fibre contained in the oblong strips and the inner reinforcing members are coated with a metallic film.

5. The wind turbine blade according to claim 4 wherein the oblong strips and the inner lightning conductor cable are interconnected at seven positions, seen in a longitudinal direction.

6. The wind turbine blade according to claim 1 wherein at least one of the carbon fibre contained in the oblong strips and the inner reinforcing members are coated with a metallic film.

7. The wind turbine blade according to claim 1 wherein the oblong strips and the inner lightning conductor cable are interconnected at seven positions, seen in a longitudinal direction.

* * * * *

UNITED STATES PATENT AND TRADEMARK OFFICE
CERTIFICATE OF CORRECTION

PATENT NO. : 6,457,943 B1
DATED : October 1, 2002
INVENTOR(S) : Kaj Olsen et al.

It is certified that error appears in the above-identified patent and that said Letters Patent is hereby corrected as shown below:

Title page,
Item [56], FOREIGN PATENT DOCUMENTS, delete "WO 98/18166" and substitute -- WO 98/18186 -- in its place.

Signed and Sealed this

Twenty-ninth Day of July, 2003

JAMES E. ROGAN
*Director of the United States Patent and Trademark Office*